(12) United States Patent
Kuperman

(10) Patent No.: US 12,307,227 B1
(45) Date of Patent: May 20, 2025

(54) CLOUD INSTANCE SELECTION BASED ON AUTOMATED PERFORMANCE METRICS COLLECTION

(71) Applicant: CAST AI Group, Inc., North Miami Beach, FL (US)

(72) Inventor: Leonid Kuperman, Toronto (CA)

(*) Notice: Subject to any disclaimer, the term of this patent is extended or adjusted under 35 U.S.C. 154(b) by 0 days.

(21) Appl. No.: 18/661,997

(22) Filed: May 13, 2024

Related U.S. Application Data

(60) Provisional application No. 63/565,550, filed on Mar. 15, 2024.

(51) Int. Cl.
| | | |
|---|---|---|
| *G06F 11/36* | (2025.01) | |
| *G06F 8/61* | (2018.01) | |
| *G06F 8/65* | (2018.01) | |
| *G06F 9/455* | (2018.01) | |
| *G06F 16/00* | (2019.01) | |
| *G06F 16/23* | (2019.01) | |

(52) U.S. Cl.
CPC ............. *G06F 8/61* (2013.01); *G06F 16/23* (2019.01)

(58) Field of Classification Search
CPC . G06F 3/123; G06F 16/23; G06F 8/60; G06F 11/3608
See application file for complete search history.

(56) References Cited

U.S. PATENT DOCUMENTS

| | | | |
|---|---|---|---|
| 10,140,206 B2* | 11/2018 | Sapozhnikov | G06F 11/3672 |
| 2016/0034305 A1* | 2/2016 | Shear | G06F 16/285 |
| | | | 707/722 |
| 2019/0303127 A1* | 10/2019 | Krishnaswamy | H04L 43/16 |
| 2020/0326923 A1* | 10/2020 | Kaler | G06N 20/00 |
| 2021/0303582 A1* | 9/2021 | Boaz Costa Leite | G06F 7/14 |
| 2022/0300280 A1* | 9/2022 | Rafey | G06F 8/60 |
| 2022/0407915 A1* | 12/2022 | Kempanna | G06F 9/45558 |
| 2022/0413989 A1* | 12/2022 | Karri | G06F 9/5027 |
| 2023/0086361 A1* | 3/2023 | Wan | G06F 11/1433 |
| | | | 702/186 |
| 2024/0231921 A1* | 7/2024 | Patel | G06F 9/5027 |

* cited by examiner

*Primary Examiner* — S. Sough
*Assistant Examiner* — Mohammad H Kabir
(74) *Attorney, Agent, or Firm* — Fenwick & West

(57) ABSTRACT

A system or method for selecting an instance family for deploying a target application. The system accesses a configuration that specifies a target application, relevant performance metrics, and various instance families that are candidates for deployment. For each instance family, the target application is temporarily deployed during a specified test period, and the performance metrics are recorded and stored. These metrics are then analyzed to generate rankings corresponding to the instance families. Based on these rankings, a recommendation is generated for an instance family for the application deployment based on ranking metrics.

20 Claims, 11 Drawing Sheets

Test configuration
200

```
1  {
2    "experimentName": "perf-test-3",                                                              ← 202
3    "sqliteConnectionString": "Data Source=./experiment.db; Version=3;",
4    "CASTAI_API_KEY": "701f536ae99fc1c01d67131b7209c7c466033ad3beb0c8d238b298719957028e6",        ← 204
5    "CASTAI_CLUSTER_ID": "3969bebd-f9cd-4bf3-bd2d-1c99d00757f",                                  ← 206
6    "deploymentName": "perf-test-app",                                                            ← 207
7    "deploymentNamespace": "perf-test-ns",                                                        ← 208
8    "targetPercentage": 20,                                                                       ← 209
9    "prometheusURL": "http://localhost:9090",                                                     ← 210
10   "metricExpressions": {                                                                        ← 220
11     "RPS": "sum(rate(request_count_total{service=\"perf-test-service\"}[1m]))",                ← 230
12     "Latency_p50": "avg(histogram_quantile(o.50, rate(request_latency_seconds_bucket{service+\"perf-test-service\"}[1m])))",
13     "Latency_p50": "avg(histogram_quantile(o.50, rate(request_latency_seconds_bucket{service+\"perf-test-service\"}[1m])))",
14   },
15   "aggregationGranularity": 60,                                                                 ← 240
16   "experimentLength": 300,                                                                      ← 250
17   "Lifecycle_spot": true,                                                                       ← 260
18   "Lifecycle_onDemand": false,                                                                  ← 265
19   "instanceFamilies": [                                                                         ← 270
20     "n2d",
21     "t2d",
22     "e2",
23     "c2d",
24     "n1"
25   ],
26   "errorRateToleration": 5,                                                                     ← 280
27   "latencyToleration": "500ms"                                                                  ← 290
28  }
```

FIG. 2

```
1  REQUEST_COUNT = Counter(                                                    — 310
2    'request_count', 'Total web app request count',
3    ['method', 'endpoint', 'http_status']
4  )
5
6  REQUEST_LATENCY = Histogram(                                                — 320
7    'request_latency_seconds', 'Latency of requests in seconds',
8    ['method', 'endpoint']
9  )
```

FIG. 3

Generating load simulating user activities
400

```
1   from locust import HttpUser, task, between
2
3   class QuickstartUser(HttpUser):
4       wait_time = between(.1, .1)        ← 410
5
6       @task
7       def move_date(self):               ← 420
8           self.client.get("/move-data", headers={"Connection": "close"})
9
10      @task
11      def estimate_pi(self):             ← 430
12          self.client.get("/estimate-pi", headers+{"Connection": "close"})
13
14      @task
15      def store_and_read(self):          ← 440
16          self.client.get("/store-and-read", headers={"Connection": "close"})
```

FIG. 4

| Index | family_name | metric_name | metric_value | price_per_core |
|---|---|---|---|---|
| 0 | c2d | Latency_p50 | 0.265236 | 0.010404 |
| 1 | c2d | Latency_p95 | 0.409835 | 0.010404 |
| 2 | c2d | RPS | 12.673459 | 0.010404 |
| 3 | e2 | Latency_p50 | 0.475710 | 0.010114 |
| 4 | e2 | Latency_p95 | 0.859132 | 0.010114 |
| 5 | e2 | RPS | 6.161007 | 0.010114 |
| 6 | n1 | Latency_p50 | 0.517464 | 0.009496 |
| 7 | n1 | Latency_p95 | 0.812394 | 0.009496 |
| 8 | n1 | RPS | 7.168286 | 0.009496 |
| 9 | n2d | Latency_p50 | 0.236317 | 0.008562 |
| 10 | n2d | Latency_p95 | 0.398044 | 0.008562 |
| 11 | n2d | RPS | 13.409305 | 0.008562 |
| 12 | t2d | Latency_p50 | 0.230016 | 0.007068 |
| 13 | t2d | Latency_p95 | 0.320408 | 0.007068 |
| 14 | t2d | RPS | 11.300432 | 0.007068 |

Access a configuration specifying a target application, one or more performance metrics, and a plurality of instance families that are candidates for deployment
910

For each instance family of the plurality of instance families, perform experiment
920

Temporarily deploy the target application on a test node using the instance family during a test time range
922

Collect and store values of the one or more performance metrics on the test node in a data store
924

Input the values of the one or more performance metrics for each of the plurality of instance families into a model, the model outputting a ranking metric for each instance family based on its corresponding values
930

Generate a recommendation of an instance family based on its ranking metric
940

FIG. 9

CLOUD INSTANCE SELECTION BASED ON AUTOMATED PERFORMANCE METRICS COLLECTION

CROSS-REFERENCE TO RELATED APPLICATION

This application claims the benefit of U.S. Provisional Application No. 63/565,550, filed Mar. 15, 2024, which is incorporated by reference in its entirety.

TECHNICAL FIELD

This disclosure relates generally to cloud computing, and more specifically automating selection of cloud instances through experimentation.

BACKGROUND

In cloud computing environments (e.g., Kubernetes environment), different applications and workloads have varying resource requirements. Selecting the right instance ensures that there is a good match between the compute resource provided by the instance, such as central processing unit (CPU), memory, and I/O capabilities, and the demands of the application. Some instances are optimized for specific types of workloads, such as compute-optimized instances for CPU-intensive applications or memory-optimized instances for applications that require a lot of RAM. Choosing the right instance type can greatly enhance the efficiency of resource usage. Certain workloads may have specific compliance requirements that dictate the type of hardware or the security features needed. For example, workloads handling sensitive data might require instances that comply with specific security standards. This matching between the applications and instances is critical to achieving the desired performance without resource wastage.

Cloud providers offer a range of instance types, each with a different computing power, memory, and I/O capability, based on their specifications. By selecting the most appropriate instance type for a particular workload, organizations can manage their cloud applications more effectively. Over-provisioning or allocating more resources than necessary can lead to unnecessary costs or environmental impact due to wasted computing power and energy consumption. On the other hand, under-provisioning or allocating fewer resources than needed, can impact system performance and user experience. Under-provisioning may result in slower application response times and reduced reliability.

SUMMARY

Instance families, particularly in cloud computing, may differentiate themselves primarily by the types of workloads they are optimized for based on their configuration of computational resources like CPU, memory, storage, and networking capabilities. By selecting the most appropriate instance family for a particular workload, organizations can manage their cloud applications more effectively. However, in many cases, it is not apparent which instance family is the best for a particular application. Organizations often select instances based on service provider's suggestions, which may not always align with the specific needs of their applications.

Embodiments described herein solve the above-described problem through a method or a system configured to select an instance family for deploying any given application. The system accesses a configuration that specifies the target application, one or more performance metrics, and a list of potential instance families. Each instance family is then tested by deploying the target application on a test node during a specified time range, and the performance metrics for the deployed target application on the test node are collected and stored. After the testing, the gathered performance data for each instance family is inputted into a model that computes a ranking metric for each instance family based on their performance. This model analyzes a variety of metrics such as requests per second (RPS) and/or latency. A more complex model may incorporate weighted formulas that factor in both the performance metrics and associated costs, providing a balanced view of efficiency and expenditure. The system then selects an instance family based on its ranking metric, and generates a recommendation, recommending the selected instance family for deployment. Alternatively, the system automatically deploys the application onto the selected instance family. After the deployment, the system may continue to monitor the performance of the application and dynamically perform the test again to recommend or deploy the application onto a different instance family.

In some embodiments, the system also generates and applies different loads to simulate user activities on the test node, causing the test node to respond to these loads. The performance metrics of the test node are collected during these interactions from both the client and server systems' perspectives. This dual viewpoint provides a comprehensive understanding of the test node's performance throughout the testing period.

In some embodiments, the system also dynamically generates visualizations of these performance metrics and creates a graphical user interface to present them to users. These visualizations may display a stream of performance metrics in a visual format and/or a rank of the instance families, facilitating the interpretation of the rationale behind the recommendation of the instance family in near real time. The graphical user interface may also allow users to manipulate views of the visualizations, providing a means for users to engage directly with the data through the interface to explore various performance metrics from multiple perspectives.

This systematic approach ensures that recommendations for an instance family are based on testing and analysis, leading to an optimized selection that meets specific performance and/or pricing criteria.

BRIEF DESCRIPTION OF THE DRAWINGS

FIG. 2 illustrates an example configuration file in accordance with one or more embodiments.

FIG. 3 illustrates example code for collecting server-side metrics in accordance with one or more embodiments.

FIG. 4 illustrates example code for generating a load to simulate user activities in accordance with one or more embodiments.

FIG. 8 is an example GUI that visualizes performance metrics and price metrics of multiple instance families in accordance with one or more embodiments.

FIG. 9 is a flowchart of a method for selecting an instance family among a plurality of instance families for a target application in accordance with one or more embodiments.

Figure 1A:
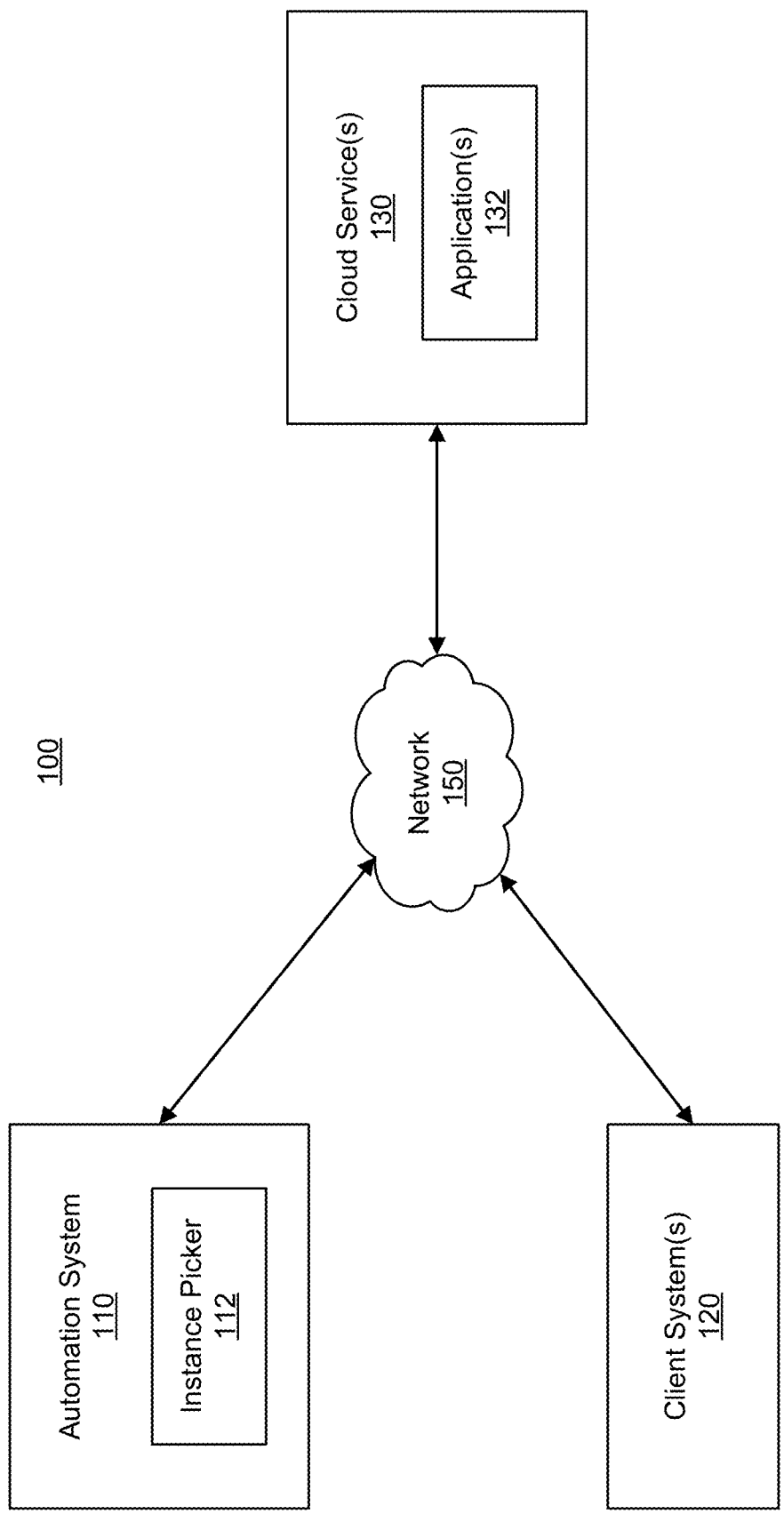
FIG. 1A is a block diagram of a system environment in which an automation system that includes an instance picker in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Existing instance pickers often select instances based on the lowest possible price or vendor recommendations. However, it is impossible for users to determine if their applications are getting the most value in terms of work performed. For example, consider a scenario where instance A consumes 50% less power than instance B, but can only perform 30% of the work in a given time period. Existing instance pickers would choose instance A. However, a more effective choice would be instance B, which provides greater value despite its higher power consumption.

An instance picker described herein solves the above-described problem. The instance picker performs tests on various instance families, collecting empirical performance data and custom benchmarks for them. The instance picker selects instance families based on the collected performance data rather than relying on vendor recommendations. The instance picker prioritizes instance selection based on a balance between performance metrics and cost. This approach may lead to the selection of non-traditional or less popular instances that entities might not consider without these tests.

The instance picker accesses a configuration that specifies a target application, metrics sources, and performance indicators, such as request per second (RPS), average latency, and P95 latency, etc. The instance picker then tests various instance families by collecting metrics over a set duration and recording the results for each instance family. After testing, the best configuration is determined through a value formulation that considers multiple performance metrics and cost metrics. The instance picker then concludes with a recommendation for the best instance family based on empirical data and cost-performance analysis.

However, conducting these tests and collecting performance metrics present several technical challenges, including the validity of metrics collection, price volatility, experimental bias due to workload variability, scalability of data storage, integration and continuity in live environments, and the comprehensive gathering of entity metrics. The instance picker described herein addresses these issues through the implementation of various embodiments and modules.

In some embodiments, to ensure the accuracy and reliability of the metrics collected, the instance picker implements a wait module. This module verifies that all deployable units (e.g., Kubernetes pods) are operational on a test node before metrics collection begins, safeguarding the integrity of the collected metrics data.

Further, cloud instance prices, particularly spot instance prices, can fluctuate significantly. These fluctuations can impact the cost-efficiency determinations made during the experimentation phase. To mitigate this, the instance picker may incorporate a dynamic re-assessment process that reassesses instance family selection whenever significant price changes occur, e.g., price change is greater than a predetermined threshold.

Similarly, the performance of an application can also vary greatly depending on the type and intensity of the workload. To minimize experimental bias and achieve consistent results, the instance picker may conduct a seasonality analysis. This analysis helps determine a minimum duration needed for experiments to accurately capture typical workload fluctuation, utilizing autocorrelation analysis to identify the most representative testing timeframe.

The experimental data and metrics may be stored in databases. Using SQLite databases may be suitable for smaller deployments, but not for larger deployments or extensive testing scenarios due to scalability issues. Responsive to identifying a large target application or a large testing scenario, the instance picker can upgrade the database solution to more robust database solutions, such as distributed SQL databases, which are capable of managing larger data volumes and delivering enhanced performance under load.

Additionally, directly applying experimental results to live deployment environments may disrupt operations or degrade performance if not managed cautiously. The instance picker may address this problem by employing a controlled rollout approach, such as canary deployments. This method involves gradually shifting a small portion of traffic to new instance configurations based on the experimental outcomes, allowing for performance monitoring and scaling as confidence in the new setup grows.

Also, not all deployments are equipped with the same level of metric instrumentation, and some entities or cloud service accounts associated with entities may lack the necessary tools or configurations to provide detailed performance data. The instance picker may provide monitoring tools and/or cause the entities to expose relevant metrics through custom endpoints. For cloud environments where certain performance metrics are not available, the instance picker may be configured to observe network-level communication traffic to obtain indirect performance insights.

Additional details about the instance picker are further described below with respect to FIGS. 1-9.

System Architecture

FIG. 1A is a block diagram of a system environment 100 in which an automation system 110 that includes an instance picker 112 in accordance with one or more embodiments. The instance picker 112 is configured to select an instance for an application 132 hosted by a cloud service 130. The environment 100 includes the automation system 110, one or more client systems 120, and one or more cloud service(s) 130, all interconnected via a network 150. The cloud service(s) 130 host one or more application(s) 132. The cloud service(s) 130 also provides a variety of instance families to accommodate different computing needs of these applications 132. The client system(s) 120 are computing systems associated with various entities. These entities include entities that can modify or deploy the applications 132 on the cloud service 130, as well as end-users who engage with these applications 132.

When the client system 120 sends an instruction to the automation system 110 that a target application is to be deployed on the cloud service 130, the instance picker 112 conducts experiments across various instance families and determines values of one or more performance metrics based on the experiments. The instance picker 112 then inputs these values of the performance metrics into a model that outputs a ranking metric for each instance family. Based on these rankings, the instance picker 112 generates a recommendation, recommending an instance family.

In some embodiments, the automation system 110 automatically configures the experiments based on available instance families and workload of the application. For example, the automation system 110 may perform a seasonality analysis on the application to determine a minimum duration needed for an experiment for the application.

In some embodiments, the client system 120 may also be allowed to configure the experiments. The configuration specifies the target application, one or more performance metrics, and a list of instance families under consideration for deployment. The one or more metrics for each of the list of instance families are to be measured during the experiments. The one or more performance metrics may be associated with CPU utilization, memory usage, disk I/O operations, or network bandwidth. The configuration may also specify additional attributes of the experiment, such as experimentation time, aggregation granularity, error rate toleration, latency toleration, etc. The configuration may be stored in a configuration file, such as a JSON file.

Figure 1B:
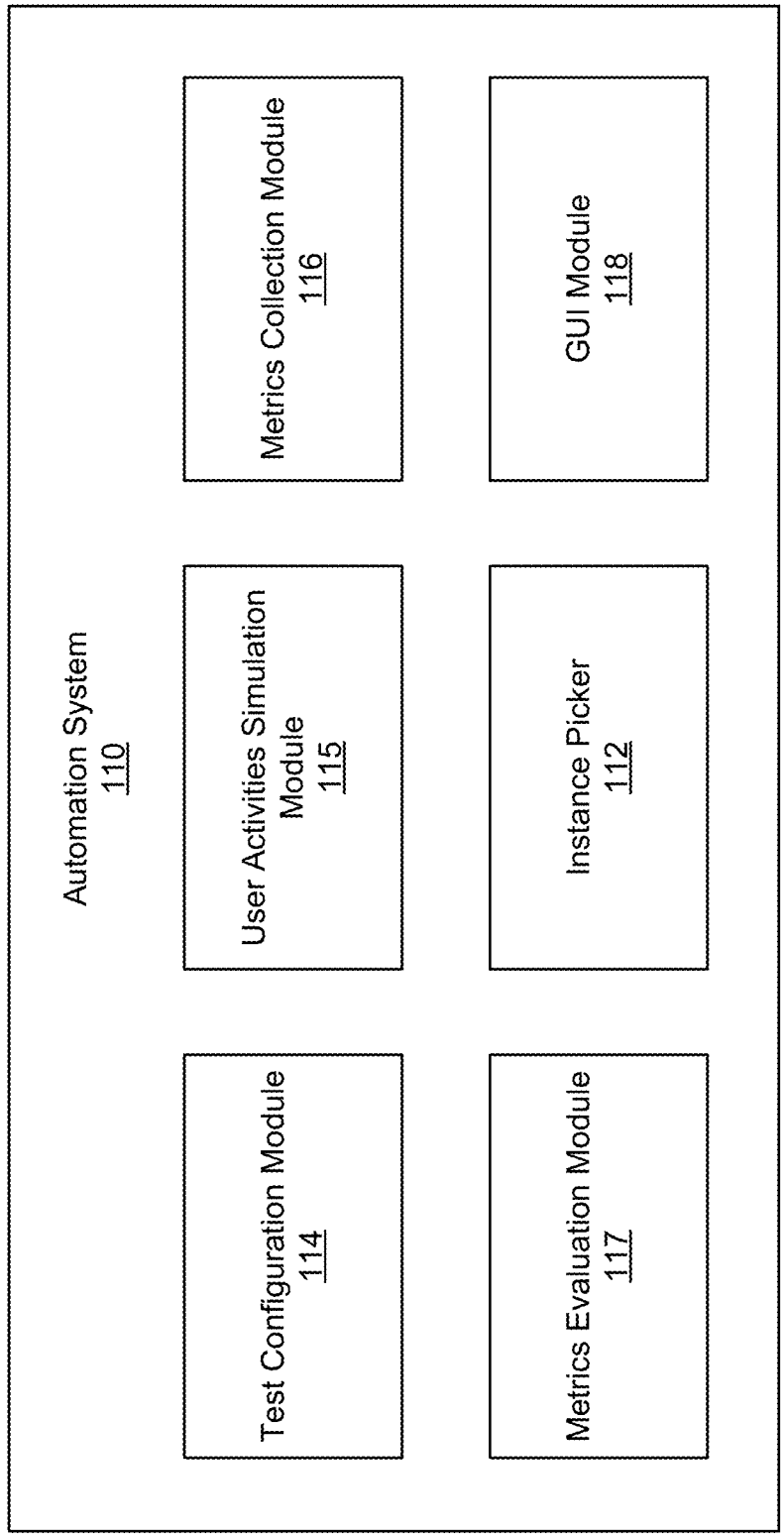
FIG. 1B is a block diagram of an architecture of an automation system in accordance with one or more embodiments.

FIG. 1B illustrates a block diagram of an example architecture of an automation system 110 in accordance with one or more embodiments. The automation system 110 includes a test configuration module 114, a user activities simulation module 115, a metrics connection module 116, a metrics evaluation module 117, an instance picker 112, and a graphical user interface (GUI) module 118. In some embodiments, there may be more or fewer modules in the automation system 110, and the distribution of functions among these modules may vary.

The test configuration module 114 is configured to generate a test configuration or modify a test configuration template. In some embodiments, the test configuration module 114 can adapt these configurations based on inputs received from a client system 120, tailoring the tests to the specific needs of specific applications. For example, users can select from a predetermined set of tests provided by the automation system, causing the selected tests to be performed on an application. For advanced users, there may also be an option to input their own source code to implement custom tests, allowing for greater flexibility and targeted testing based on unique user needs or advanced application situations.

The user activities simulation module 115 is configured to generate loads that simulate user activities. These activities may include interactions between users and applications, including various types of requests. These activities may be application specific, or non-application specific. For example, these activities may include simulating users accessing various web pages to test load times and server response. Additionally, these activities may also include simulating form entries and submissions to assess database interactions, form processing, and response handling. In some embodiments, user activities are seasonal. Waiting for a cycle of seasonal user activities can take a long time, as the peak of these activities may only occur occasionally. Simulating user activities allows the application to perform tests in a shortened cycle.

The metrics collection module 116 is configured to collect performance metrics from different instance families during tests. In some embodiments, the metric collection module 116 may include an internal metrics collection service configured to collect performance metrics from applications 132. Alternatively, the metric collection module 116 is configured to communicate with a third-party metrics collection service or a metrics collection service on the cloud service 130. The metrics collection service can be an open-source service, such as Prometheus, or a closed-source service.

The metrics evaluation module 117 is configured to analyze the collected performance metrics and generate a score for each instance family based on the analysis. The score may be generated based on a model that balances both the performance and pricing of each instance family. In some embodiments, the model may be generated by based on user preferences. In some embodiments, multiple models may be applied to the performance metrics to generate various sets of scores.

The instance picker 112 is configured to select an instance family based on the evaluation by the metrics evaluation module 117. In some embodiments, the instance picker 112 sends the selected instance family to the client system 120 as a recommendation. Alternatively, the instance picker 112 deploys the application onto the selected instance family. In some embodiments, where multiple tests are performed simultaneously, the instance picker 112 maintains the application on the selected instance family, and discontinues the applications deployed on other instance families.

The GUI module 118 is configured to visualize the metrics and scores and sends the visualized metrics and scores to the client system 120. Upon receiving the visualizations, the client system 120 presents a GUI to the user, displaying the visualizations. In some embodiments, the visualizations may include various line charts or tables, and the user can interact with the GUI to change the views of the charts or tables.

FIG. 2 illustrates an example configuration file 200 in accordance with one or more embodiments. The configuration file 200 includes an experiment name 202, "perf-test-3." The configuration file 200 also includes a set of key value pairs that define an environment and criteria for the experiment. There are references to a database connection string 204, API 206 and cluster IDs 207.

The database connection string 204 identifies a storage location for performance metrics, which can be any database suited to this purpose, such as an SQLite database for smaller deployments or a distributed SQL database for larger, more demanding environments. In some embodiments, the instance picker 112 may configure an SQLite database initially. However, if the volume of collected performance metrics exceeds a specified threshold, the instance picker 112 may switch to a more robust database solution like a distributed SQL database, designed to handle larger data volumes and provide improved performance under heavy loads.

The configuration file 200 also includes a deployment name 208, and a namespace 209 for deployment. The deployment name 208 indicates a specific identifier assigned to a deployment configuration that manages a lifecycle of the target application, ensuring it runs in a desired state and is scaled and updated according to predefined rules. The namespace 209 indicates a deployment environment which is a logical partition within a cluster that allows isolation of resources. The namespace 209 allows specific quotas and limits to be applied to the target application.

The configuration file 200 also includes a target percentage 210 for scaling. The target percentage 210 indicates a desired utilization level of resources such as CPU or memory. For example, if the target percentage is 20%, the average CPU utilization is aimed to be maintained at 20% level across all deployable units (e.g., pods). When actual usage deviates from this target, an autoscaler may be caused to either increase or decrease a number of pods to bring the utilization back to this level.

The configuration file 200 also includes a URL of a metric collection service 220 for metrics collection. The metric collection service 220 is configured to gather and store performance metrics as time series data, with each metric captured alongside its corresponding timestamps. The collected metrics may include, but are not limited to, CPU usage, memory usage, disk I/O, request and response counts, error counts, latencies, tasks completed, throughput, active and new connections per second, connection errors, and network flows within a cluster, including inter-pod communications. In some embodiments, the metric collection service employs a pull model, retrieving metrics from target applications at predetermined intervals specified in the configuration.

In some embodiments, the instance picker 112 checks if the application or its associated entity has access to one or more metric collection services and selects a service based on this access. Additionally, the instance picker 112 may select a metric collection service based on a predefined list of metrics that need to be collected. In some embodiments, the entity associated with the application may also be allowed to choose the metric collection service for gathering application-specific metrics.

In some embodiments, the metric collection service 220 may be an open-source service, such as Prometheus, Envoy, Cilium, etc. Alternatively, or in addition, the metric collection service may be a closed source or proprietary service provided by the automation system 110.

The configuration file 200 also includes a set of metric expressions 230. The metric expressions 230 define a set of performance metrics that are to be monitored and collected. As illustrated, the metric expressions 230 include requests per second ("RPS"), latency P50, and latency P95 percentiles. RPS is a measure of a number of requests that the application can handle every second. In performance testing and monitoring, RPS is an indicator of an application's throughput and is often used to assess the scalability and efficiency of an application under load. Higher RPS values typically indicate better performance and the ability to handle more traffic. P50 and P95 are terms used in statistics and performance monitoring to describe percentiles, which are values below which a certain percentage of data falls. P50, also known as the $50^{th}$ percentile, is a median value of latency. It means that 50% of the data points are below this value and 50% are above. In the context of latency, P50 is the median response time, indicating that half of the requests are faster than this time, and half are slower. P95, also known as the $95^{th}$ percentile, is a value that 95% of requests are processed within this time frame, and only 5% are taking longer. P95 is often used as an indicator of the upper bounds of normal latency and helps to understand the long tail of slower requests. P50 and P95 are helpful in evaluating the consistency of an application's performance.

The above-described metrics are client-side metrics that are collected from the perspective of client system users. These metrics reflect users' experience while interacting with the target application. In some embodiments, server-side metrics are also collected. Server-side metrics are collected from the perspective of the servers that host the target application. These metrics provide insights into the health and performance of the backend infrastructure.

FIG. 3 illustrates example code 300 for collecting server-side metrics in accordance with one or more embodiments. The code 300 defines two server-side metrics, a request counter 310 and a request latency 320. The request counter 310 is configured to track a cumulative number of requests received by the target application over the testing period. The request latency 320 is configured to track an amount of time it takes for the target application to process a request. The request latency 320 may be measured from a first time a request is received from a user to a second time a response is sent to the user.

The above-described performance metrics are a mere few examples. Additional or different metrics may also be included in the configuration file 200, such as CPU utilization, disk I/O operations, error rates, and thread counts, among others. A person in the art would understand that the principles described here are applicable to any other performance metrics that can be obtained and evaluated.

Referring back to FIG. 2, in addition to the performance metrics, there are additional attributes that are being set in the configuration file 200, such as aggregation granularity 240, experiment length 250, life cycle spot 260, life cycle on demand 265, instance families 270, error rate toleration 280, latency toleration 290.

The aggregation granularity of 240 is set to 60 seconds, and an experiment length of 250 is set to 300 seconds. Aggregation granularity 240 refers to a time interval over which performance metrics are aggregated to provide a summarized value. For instance, if the aggregation granularity is set to 60 seconds, it means that all the data points (such as a number of requests or latency measurements) collected within each 60-second period are aggregated. This could involve calculating averages, sums, or other statistical measures relevant to the specific metric within that 60-second window. The experiment length 250 indicates a total duration for which the experiment is run. In the example configuration file 200, the experiment length 250 is set to 300 seconds, i.e., 5 minutes.

As described above, the performance of the target application can vary greatly depending on the type and intensity of the workload. To minimize experimental bias and achieve consistent results, the instance picker 112 may conduct a seasonality analysis first. This analysis helps determine a minimum duration needed for experiments to accurately capture typical workload fluctuation, utilizing autocorrelation analysis to identify the most representative testing timeframe. The instance picker 112 then sets the experiment length 250 to the determined minimum duration.

The life cycle spot 260 and on demand 265 are flags for instance type preferences. As shown in the example configuration file 200, the life cycle spot 260 is set as true, and life cycle on demand 265 is set as false, indicating that spot instances are to be used, but not on demand instances. Spot instances and on-demand instances are two different types of compute instances an application can use in cloud computing platforms, and they refer to different methods of accessing compute capacity. Spot instances are available based on supply and demand, and can change frequently. Spot instances can be interrupted or terminated by the cloud provider with little to no warning if the demand for compute capacity increases or if the current price exceeds the maximum price the application or an entity has specified. They are ideal for flexible, fault-tolerant applications that can handle unexpected terminations, and they are often used for batch processing jobs, background processing, or non-critical tasks. On-demand instances can be launched at any time and will run continuously until stopped or terminated by entities. They are suitable for applications that require a guaranteed and uninterrupted service, and they are typically used for critical workloads that need to be kept running continuously.

In some embodiments, the instance picker 112 is configured to set the life cycle spot 260 and on demand 265 flags based on the characters of the target application. In some embodiments, the entity associated with the target application is allowed to set these flags.

The configuration file 200 also lists instance families 270 (e.g., n2d, t2d, e2, c2d, n1) that are to be considered for running the experiment. In cloud computing, instance families are grouped based on their optimized resources and intended use cases. N2d is an instance family generally optimized for general-purpose workloads. They offer a balance of compute, memory, and networking resources and are generally powered by specific types of processors (e.g., AMD EPYC processors). They are suitable for a wide range of applications. T2d is a newer, cost-effective, general-purpose instance family with burstable performance. Such instances are ideal for workloads that do not use full CPU continuously but occasionally need to burst to handle peak loads. E2 is also a general-purpose instance family and is often the most cost-effective option for workloads that have consistent performance requirements. They provide a fixed performance level without any additional overhead of CPU credits and bursting capabilities. C2d is a compute-optimized instance family, designed for compute-intensive workloads. They are likely to be suitable for applications that require a high CPU performance, such as batch processing, media transcoding, gaming servers, or scientific modeling. N1 is an older general-purpose instance family that offers a good balance of compute, memory, and network resources.

Notably, each instance family is designed with certain strengths and may excel in one area, such as CPU, memory, or network performance. However, the best choice for a particular application depends on the unique requirements and behavior of the application in question. For example, general-purpose instances (e.g., n2d, e2, n1) are balanced in terms of compute, memory, and networking. They are good for a variety of common applications, but might not be optimized for tasks that require heavy CPU or memory resources. Burstable instances (e.g., t2d) are designed to perform well for workloads that are typically light on CPU usage but occasionally need to burst to higher performance levels. Compute-optimized instances (e.g., c2d) provide high CPU performance and are suitable for compute-intense applications, but may not be as cost-effective for applications with moderate compute needs. Given these differences, the best instance for an application might not be clear without experiments. Performance experiments can reveal how different instance types handle the application's load, taking into consideration aspects like CPU intensity (e.g., how much processing power the application requires), memory usage (e.g., an amount of RAM desirable for normal performance), I/O performance (a speed of data transfer desirable, both internally and externally), network throughput (an amount of network bandwidth desirable), and/or cost efficiency (balancing performance needs and budget constraints). Embodiments described herein enable dynamic and automated selection of appropriate instance families based on performance data for any given application, which leads to more efficient deployment and significant reduction of computing resources.

Additionally, the configuration file 200 also includes an error rate toleration 280 and a latency toleration 290. The error rate tolerance indicates an acceptable percentage of errors that can occur during the experiment before it is considered a problem. For example, an error rate toleration of 5% means that out of 100 requests to the application, up to 5 can fail without causing concern. Similarly, latency toleration indicates a maximum response time that is considered acceptable for the experiment of the application. For example, a latency toleration of 500 ms means that the application is allowed to tolerate response times of up to 500 ms (i.e., half a second). Requests that take longer than 500 ms may be considered as violating a performance target of the application. In some embodiments, when these thresholds are reached, the experiment for a corresponding instance family may be terminated, and that instance family is deemed unfit for the application.

In some embodiments, during experiments, the deployment of the target application might be configured to process real user requests. Alternatively, the deployment of the target application could be set up to process simulated user requests configured to closely mimic actual user behavior. As previously described, an application may exhibit seasonality with user demand varying according to the time of day, week, month, or during specific seasonal events. Simulated user activities can be configured to reflect these fluctuations or to replicate the conditions of a particular event, such as peak times. Moreover, these simulated demands can compress various events and demand fluctuations into a short testing period, thereby minimizing the required duration to gather adequate performance metrics effectively.

In some embodiments, during the experiment, the instance picker 112 causes a load to be generated onto the node where the application is deployed to simulate user activities. FIG. 4 illustrates example code 400 for generating a load to simulate user activities in accordance with one or more embodiments. The code 400 uses a load testing module, e.g., locust to define a class (e.g., "QuickstartUser") for a simulated user. The simulated user is configured to perform different tasks to test the performance of a target application. The simulated user will make HTTP requests to the target application. The "wait time" attribute 410 indicates that the simulated user will wait between 0.1 seconds after each task is executed. There are three task methods (e.g., move_date 420, estimate_pi 430, and store_and_read 440 methods) defined within the "QuickstartUser" class, each represents a different task that the simulated user will perform. Each task is a method that makes a GET request to a specified endpoint on the server (e.g., "/move-data", "/estimate-pi", "/store-and-read"). During the experiment, multiple instances of "QuickstartUser" may be spawned many times to simulate many users accessing the target application. The performance and robustness of the application can be evaluated by analyzing how well it responds to these simulated requests.

Example Instance Picker Workflow

Figure 5:
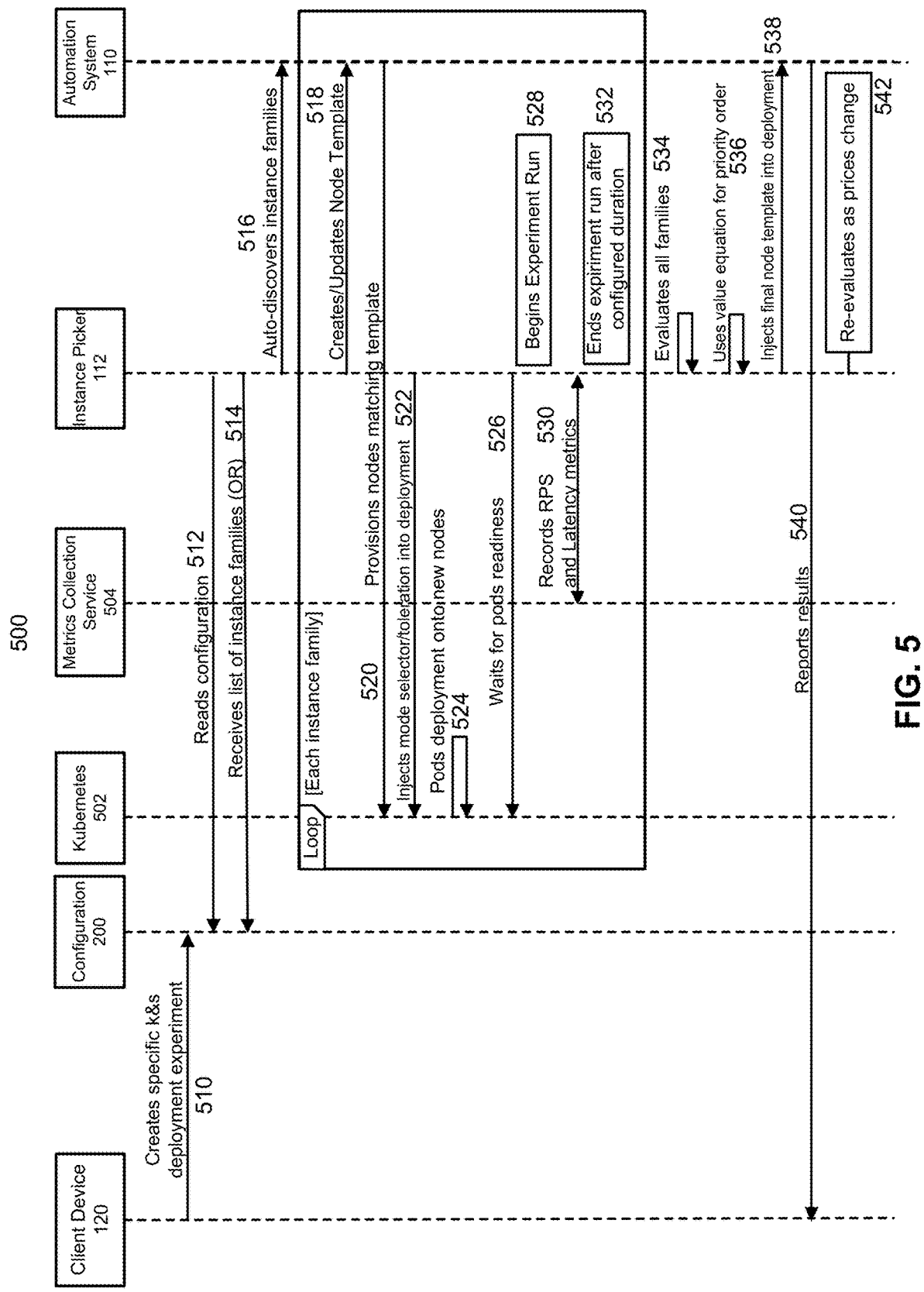
FIG. 5 is a flowchart of an instance picker workflow in accordance with one or more embodiments.

FIG. 5 is a flowchart of an instance picker workflow 500 in accordance with one or more embodiments. The workflow 500 is applied by the instance picker 112 for selecting the best instance family for deploying an application in a Kubernetes environment. The workflow 500 involves various devices and components, such as a client system of a user (e.g., client system 120), a configuration (e.g., the configuration file 200), a Kubernetes service 502, a metrics collection service 504 (e.g., Prometheus), an instance picker (e.g., instance picker 112), and an automation system (e.g., automation system 110).

A user at the client system 120 starts workflow 500 by creating a Kubernetes deployment experiment (represented by arrow 510). Specification of the Kubernetes deployment experiment may be recorded in a configuration file 200. As described above, the configuration file 200 includes a deployment name 202, a list of performance metrics that are to be tracked, and a list of instance families on which the target application is to be deployed. The configuration file 200 is read or modified by the instance picker 112 (represented by arrow 512) and receives the list of instance families (represented by arrow 514). The instance picker 112 passes the list of instance families to the automation system 110 (represented by arrow 516) and causes the automation system to create or update the node template for each of the instance families (represented by arrow 518).

A node template is a specification that defines a configuration for a node. Nodes are machines (either physical or virtual) where containers and workloads run. A node template may include (but is not limited to) an instance family, an image ID, a disk size, tags or labels, network information, and/or scaling policies. The instance family is one of the instance families on the list specified in the configuration file 200. The image ID is an ID of a base image that is to be used for creating the node, which could be an operating system or a specialized machine image with certain software pre-installed. The disk size is an amount of storage space that is to be allocated to the node. Tags and/or labels are key-value pairs that allow the application to categorize and manage nodes in a cluster based on criteria such as environment, role, owner, or any other identifier. The network information includes details about network configuration, like virtual private cloud (VPC) settings, subnet IDs, security group IDs, and other network parameters that define how the node interacts within the network. The scaling policies include instructions on how the node should scale, both vertically (size of instances) and horizontally (number of instances).

For each instance family, a node template is generated. The automation system 110 causes the Kubernetes service to provision a new node matching the node template (represented by arrow 520). Provisioning the new node includes provisioning with necessary resources, such as CPU, memory, storage, and configuring an operating system and network settings. Provisioning the new node may also include installing any required services, such as a container runtime and/or a node agent.

After the new node is provisioned, the instance picker 112 injects node selector and/or toleration into deployment (represented by arrow 522). The toleration may be the error rate toleration and latency toleration specified in the configuration file 200. The Kubernetes service then executes a deployment process (represented by arrow 524), where the target application is rolled out onto the newly provisioned nodes. The target application may be packaged into a container. The container may be stored in a container registry from where it can be rolled onto the newly provisioned nodes.

During the deployment process, as the Kubernetes service orchestrates the roll out to new nodes, the instance picker 112 waits until it confirms that deployable units (e.g., pods) are fully ready and operational (represented by arrow 526). The duration required to deploy an application onto nodes can significantly fluctuate due to various factors such as the application's size and complexity, the underlying infrastructure's capability, the speed of the network, the specifics of the deployment procedure, the orchestration tool in use, the size of the container images, and the level of deployment concurrency, among others. Typically, larger and more complex applications require a lengthier deployment time compared to their smaller and simpler counterparts. Moreover, state-of-art hardware that includes advanced CPUs, ample RAM, and SSD storage is likely to execute deployments faster than older or less advanced systems. Similarly, a swift network enhances the speed of transferring container images or application binaries to the nodes.

Notably, if the instance picker 112 starts collecting performance data before the completion of deployment, the collected performance data would not truly reflect the performance of the nodes. To promote the precision and trustworthiness of the performance data being recorded, the instance picker 112 may integrate a wait module. This wait module causes the instance picker 112 to wait until all units of deployment, such as Kubernetes pods, are fully functional on a test node before commencing the collection of performance metrics, thus preserving the accuracy of the data obtained. In some embodiments, this wait module is configured to predict a time required for deployment based on the application's size and dependencies. The wait module then sets a wait time before initiating the collection of performance metrics. This allows for an accurate assessment of the application's performance after it has been fully deployed onto the test node.

Once the deployment is completed, the instance picker 112 begins an experiment run (represented by arrow 528), during which performance data is collected and recorded by the metrics collecting service based on the configuration (represented by arrow 530). Once the experiment length is reached, the instance picker ends the experiment run (represented by arrow 532). This process repeats for each of the instance families. In some embodiments, each of the instance families is tested sequentially. Alternatively, at least two of the instance families are tested simultaneously.

In some embodiments, the performance of an application can vary greatly depending on the type and intensity of the workload. To minimize experimental bias and achieve consistent results, the instance picker 112 may conduct a seasonality analysis. This analysis helps determine a minimum duration needed for experiments to accurately capture typical workload fluctuation. In some embodiments, autocorrelation analysis is performed to identify seasonality and the most representative testing timeframe.

Autocorrelation analysis is a statistical method configured to determine a degree to which a performance metric over time correlates with itself at different intervals of lags. The performance metric may be collected as a time series data set. The time series data set is shifted by various time steps, known as lags, to calculate correlations of these shifted time series data sets with the original data set. These correlations may be used to determine how well the data correlate with itself over time. By analyzing autocorrelation at different lags, the instance picker 112 may identify patterns within the data. For example, if there is a strong autocorrelation at a lag of 24 hours, it suggests a daily pattern in the data, such as user activity peaking every day at the same time. The lag where the autocorrelation is highest can indicate the most representative timeframe for testing. This period is where the data points are most similar to each other, suggesting it's a cycle or pattern that frequently repeats. This is the timeframe that would likely provide the most consistent and reliable performance metrics if the tests were to be run. Once the most representative timeframe is identified, tests can be scheduled to run during this period to ensure that the results reflect the normal operating conditions of the system.

Once all the families are tested, the instance picker 112 evaluates the performance metrics of them (represented by arrow 534), and uses a value equation to determine a priority order (represented by arrow 536). The instance picker 112 identifies the highest-ranking node and sends the highest-ranking node to the automation system 110. Upon receiving the highest-ranking node, the automation system 110 injects the highest-ranking node template into deployment (represented by arrow 538). In some embodiments, the automation system 110 also generates and sends a report to the client system of the user (represented by arrow 540). The report shows the experiment results of different nodes corresponding to different instance families, and the rankings of the different nodes.

After the application is deployed on the highest-ranking node, the instance picker continuously monitors certain performance metrics of the node. When a value of a metric changes greater than a threshold, the instance picker re-evaluates the application against multiple instances to determine whether the current instance family is still the best for the application (represented by arrow 542). For example, cloud instance prices, particularly spot instance prices, can fluctuate significantly. These fluctuations can impact the cost-efficiency determinations made during the experimentation phase. To mitigate this, the instance picker may incorporate a dynamic re-assessment process that reassesses instance family selection whenever significant price changes occur, e.g., price change is greater than a predetermined threshold.

Example Graphical User Interface (GUI)

Figure 6:
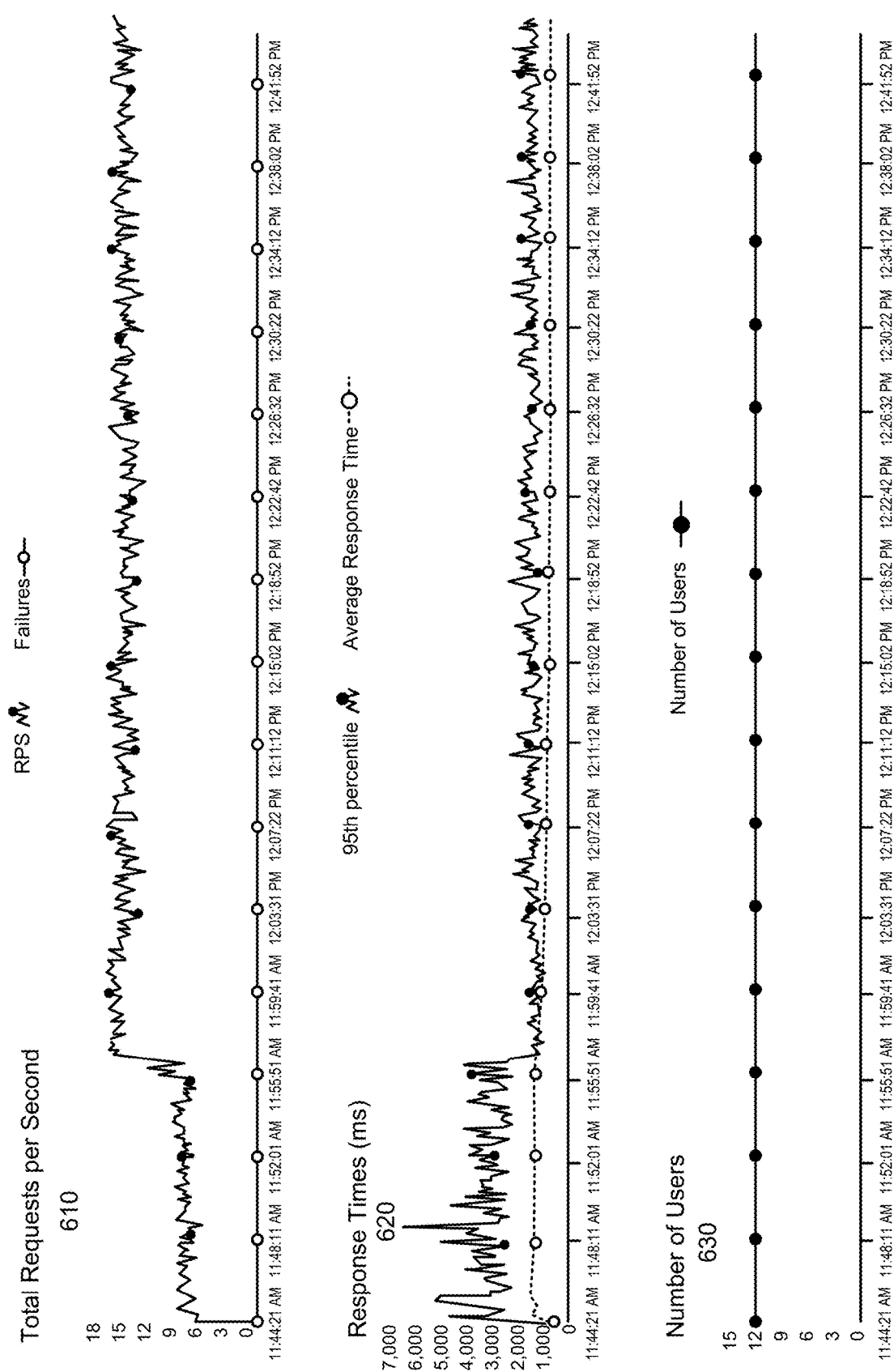
FIG. 6 illustrates an example graphical user interface (GUI) that visualizes performance metrics collected for a node where a target application is deployed in accordance with one or more embodiments.

In some embodiments, the automation system 110 is configured to visualize the performance metrics and present the visualization to the client system 120 of a user. FIG. 6 illustrates an example graphical user interface (GUI) 600 that visualizes performance metrics collected for a node where a target application is deployed in accordance with one or more embodiments. The performance metrics include total requests per second (RPS), response time (ms), and the number of users.

A top graph 610 in FIG. 6 shows a number of requests processed by the server every second (RPS), indicated by a line. There is also a "Failure %" line that is at zero or near zero, indicating that there are few to no failed requests during the timeframe of the graph. A middle graph 620 in FIG. 6 shows response times of the requests in milliseconds (ms). Two metrics are plotted: one line represents a $95^{th}$ percentile of response times, showing that 95% of requests have a response time at or below this line, while the other line represents an average response time. A bottom graph 630 in FIG. 6 indicates a number of concurrent users (e.g., simulated users) making requests to the application, which is constant throughout the test, depicted by a solid line at 12.

Figure 7A:
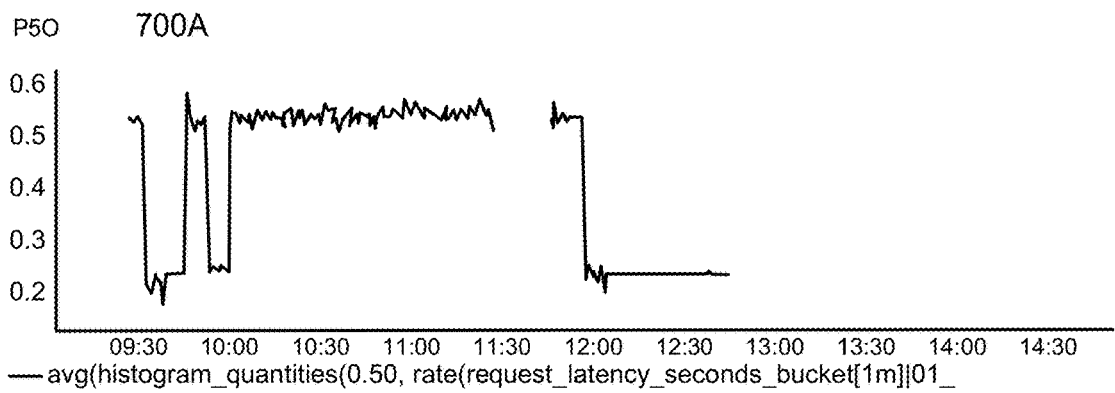
FIG. 7A is a graph depicting P50 metric (also known as the 50th percentile or median) for request latency over time in accordance with one or more embodiments.
Figure 7B:
FIG. 7B is a graph depicting a rate of requests per second (RPS) that a target application is handling over time in accordance with one or more embodiments.
Figure 7C:
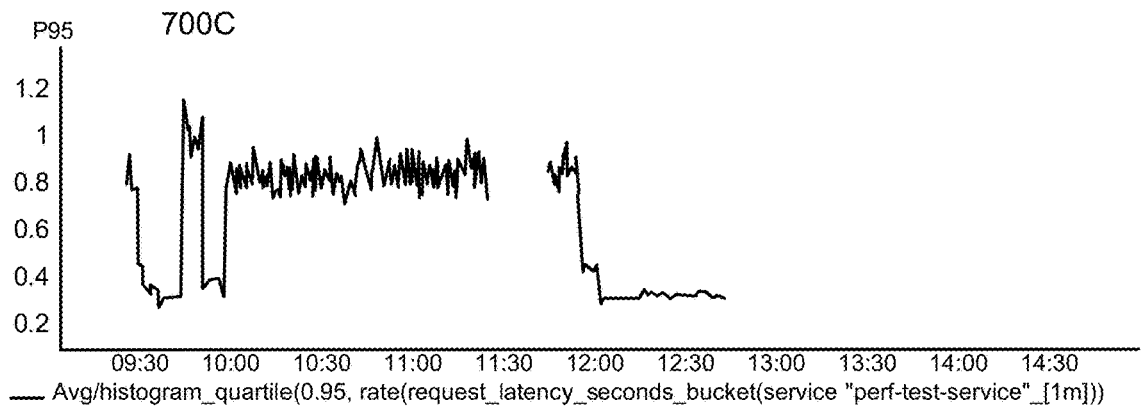
FIG. 7C is a graph depicting P95 (95th percentile) latency over time in accordance with one or more embodiments.

FIGS. 7A-7C illustrate additional example GUIs that visualize performance metrics in accordance with one or more embodiments. FIG. 7A is a graph 700A depicting P50 metric (also known as the $50^{th}$ percentile or median) for request latency over time. The y-axis represents the latency values in seconds, and the x-axis shows time of day. A line on the graph indicates a median request latency at various points throughout the day. It is shown that for most of the period, the latency is stable around 0.4 to 0.5 seconds. However, there are a couple of significant drops in latency observed, where the P50 value sharply decreases before returning to the previous level.

FIG. 7B is a graph 700B depicting a rate of requests per second (RPS) that a target application is handling over time. The y-axis shows a number of requests per second (RPS), and the x-axis represents time of day. A line illustrates fluctuation in the number of requests received by the target application at any given moment within the displayed timeframe. The graph 700B shows some volatility in the number of requests. There are peaks where the RPS sharply increases, followed by drops, suggesting intermittent bursts of traffic or activity.

FIG. 7C is a graph 700C depicting P95 ($95^{th}$ percentile) latency over time. Similar to FIG. 7A, the y-axis represents the latency values in seconds, and the x-axis shows time of day. A line on the graph indicates a median request latency at various points throughout the day. There is a spike in latency at the beginning, just before 9:30, where the P95 latency approaches 1.2 seconds. Following this spike, the latency stabilizes around 0.6 to 0.8 seconds for a substantial period. There is a sharp drop in the P95 latency after 12:00, where the latency falls around 0.2 seconds or less.

In some embodiments, the automation system 110 can also visualize performance metrics of multiple instance families in a single GUI. FIG. 8 is an example GUI 800 that visualizes performance metrics and price metrics of multiple instance families in accordance with one or more embodiments. The priority order is generated based on both performance metrics and pricing metrics. As illustrated, the GUI 800 shows instance family names, followed by their metric names, metric values, and price per core. From this GUI 800, a user can easily deduce which instance family offers the best performance for the lowest price in terms of specific metrics. The user can compare which instance family has lower latencies or higher RPS against the cost per core to make decisions on which instance type might offer the best value for a particular workload. For example, the n2d instance family seems to offer the best RPS value and has competitive latency metrics with a relatively lower price per core, which might suggest it's a cost-effective option for the target application.

Example Methods for Selecting an Instance Family for a Target Application

FIG. 9 is a flowchart of a method 900 for selecting an instance family among a plurality of instance families for a target application in accordance with one or more embodiments. In various embodiments, the method includes different or additional steps than those described in conjunction with FIG. 9. Further, in some embodiments, the steps of the method may be performed in different orders than the order described in conjunction with FIG. 9. The method described in conjunction with FIG. 9 may be carried out by the automation system 110 in various embodiments, while in other embodiments, the steps of the method are performed by any online system capable of performing these steps.

The automation system 110 accesses 910 a configuration specifying a target application, one or more performance metrics, and a plurality of instance families that are candidates for deployment. The configuration may be stored in a configuration file (e.g., configuration file 200 in FIG. 2) that is accessible by both client system 120 associated with an entity and the automation system 110. The configuration may be set by the entity associated with the target application or set by the automation system 110 automatically.

For each instance family of the plurality of instance families, an experiment is performed 920. Performing the experiment includes temporarily deploying 922 the target application on a test node using the instance family during a test time range, and collecting and storing 924 values of the one or more performance metrics on the test node in a data store. The one or more metrics may include (but are not limited to) RPS and latency, such as P50 latency, P95 latency. In some embodiments, the automation system 110 determines a time required for the application to be deployed onto the test node, and waits for the determined time before collecting the value of the one or more performance metrics.

In some embodiments, collecting values of the one or more performance metrics on the test node includes generating a load against the test node that simulates user activities over a period and collects the values of the one or more performance metrics on the test node over the period of time. Referring to FIG. 4, a class QuickstartUser may be instantiated multiple times to simulate multiple users. Each simulated user is configured to perform three different tasks, e.g., move_date, estimate_pi, store_and_read. Notably, users of different applications may perform different tasks. A different user class may be instantiated for a different application to simulate tasks that users may perform on that application.

In some embodiments, the automation system 110 may also be configured to conduct an autocorrelation analysis to the collected values of the one or more performance metrics to determine a seasonality of workload, and sets a test time range based on the determined seasonality of the workload. In some embodiments, the automation system 110 may also be configured to simulate user activities based on the seasonality of workload.

Once the experiments are performed for each of the plurality of instance families, the automation system 110 inputs 930 the values of the one or more performance metrics for each of the plurality of instance families into a model. The model is configured to output a ranking metric for each instance family based on its corresponding values. In some embodiments, the model is configured to assign weights to the one or more performance metrics and integrates the values of the one or more performance metrics into a weighted score.

The automation system 110 generates 940 a recommendation of an instance family based on its ranking metric. In some embodiments, the automation system 110 also causes the recommended instance family to be used to deploy the target application. In some embodiments, the automation system is also configured to visualize the recorded values of the one or more performance metrics and generate a graphical user interface to present the visualized recorded values. In some embodiments, for each instance family, a visualization is generated, e.g., GUI 600 in FIG. 6 and GUIs 700A-C in FIGS. 7A-7C. In some embodiments, a visualization is generated to visualize the performance of multiple instance families, e.g., GUI 800 in FIG. 8. In some embodiments, the automation system 110 ranks the plurality of instance families based on the recorded values of the one or more performance metrics, and generates a visualization to present the ranked list of the instances.

Example Computing System

Figure 10:
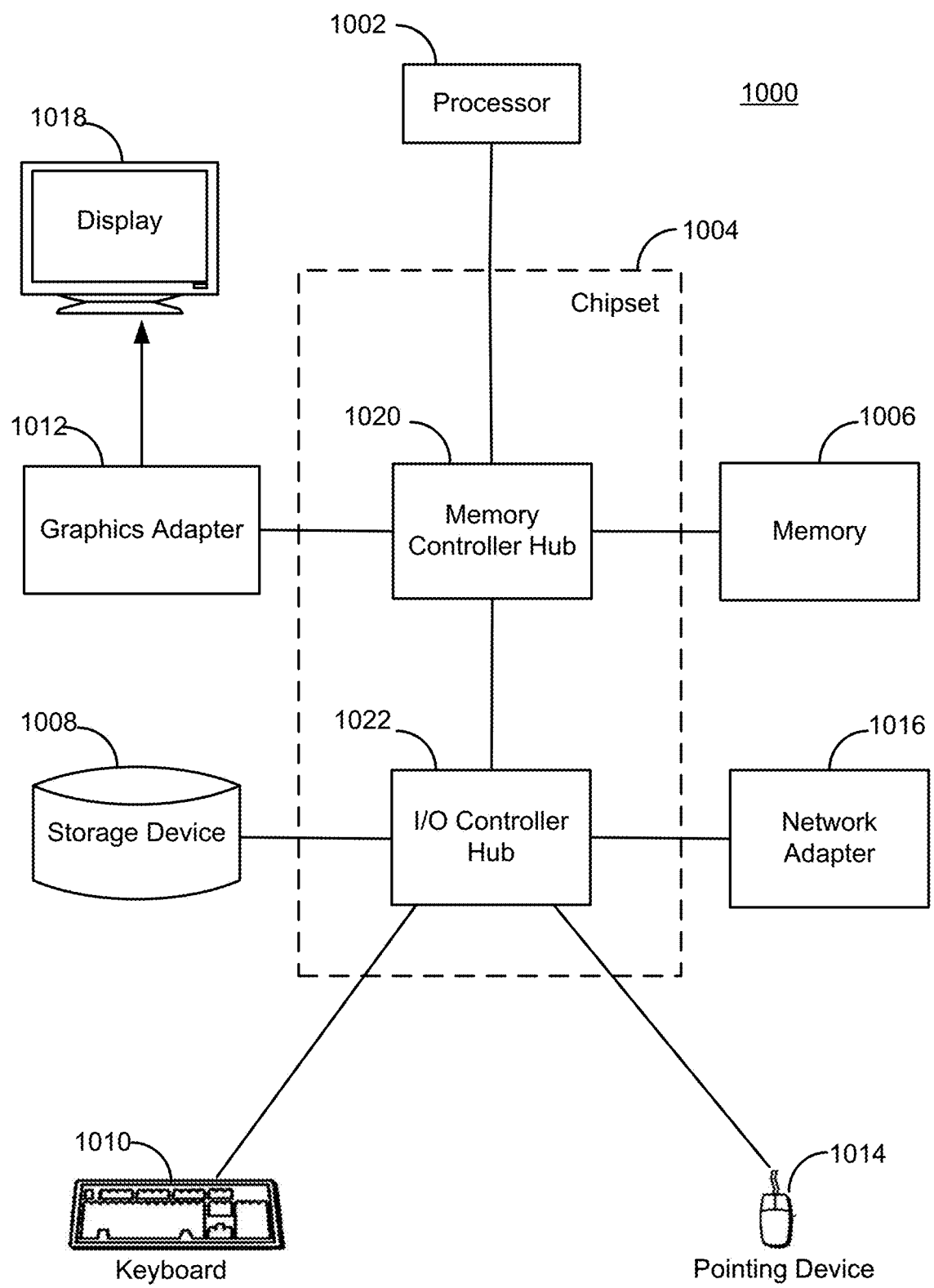
FIG. 10 is a block diagram of an example computer suitable for use in a networked computing environment in accordance with one or more embodiments.

FIG. 10 is a block diagram of an example computer 1000 suitable for use in the networked computing environment 100 of FIG. 1. The computer 1000 is a computer system and is configured to perform specific functions as described herein. For example, the specific functions corresponding to automation system 110 may be configured through the computer 1000.

The example computer 1000 includes a processor system having one or more processors 1002 coupled to a chipset 1004. The chipset 1004 includes a memory controller hub 1020 and an input/output (I/O) controller hub 1022. A memory system having one or more memories 1006 and a graphics adapter 1012 are coupled to the memory controller hub 1020, and a display 1018 is coupled to the graphics adapter 1012. A storage device 1008, keyboard 1010, pointing device 1014, and network adapter 1016 are coupled to the I/O controller hub 1022. Other embodiments of the computer 1000 have different architectures.

In the embodiment shown in FIG. 10, the storage device 1008 is a non-transitory computer-readable storage medium such as a hard drive, compact disk read-only memory (CD-ROM), DVD, or a solid-state memory device. The memory 1006 holds instructions and data used by the processor 1002. The pointing device 1014 is a mouse, track ball, touchscreen, or other types of a pointing device and may be used in combination with the keyboard 1010 (which may be an on-screen keyboard) to input data into the computer 1000. The graphics adapter 1012 displays images and other information on the display 1018. The network adapter 1016 couples the computer 1000 to one or more computer networks, such as network 150.

The types of computers used by the entities and the automation system 110 of FIGS. 1 through 10 can vary depending upon the embodiment and the processing power required by the enterprise. For example, the automation system 110 might include multiple blade servers working together to provide the functionality described. Furthermore, the computers can lack some of the components described above, such as keyboards 1010, graphics adapters 1012, and displays 1018.

Additional Considerations

The automation system 110 described herein collects and analyzes data associated with performance metrics of a target application deployed on test nodes and identifies an optimal instance family based on the collected data. The automation system 110 then facilitates the deployment of the target application onto the identified instance family, which enhances operational efficiency. Additionally, the automation system 110 may continue to track the performance of the application after deployment. Upon identifying performance shifts that exceed set thresholds, the automation system 110 may conduct a reevaluation to identify a new instance family if necessary, ensuring consistent operation on the most appropriate instance family. Moreover, the described embodiments address the technical problems involved in collecting precise performance metrics, ensuring the delivery of more accurate measurements and bolstering dependability.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcodes, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer-readable storage medium, which includes any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for selection of an instance for an application, the method comprising:
　accessing a configuration specifying a target application, one or more performance metrics, and a plurality of instance families that are candidates for deployment, where each of the plurality of instance families is a group of virtual machines having a different configuration of resources;
　for each instance family of the plurality of instance families:
　　provisioning a test node by allocating resources based on configuration associated with a corresponding instance family;
　　temporarily deploying the target application on the provisioned test node during a test time range, and collecting and storing values of the one or more performance metrics on a test node in a data store; and
　identifying one of the plurality of instance families having a highest performance for the target application relative to other ones of the plurality of instance families, comprising:
　　inputting the values of the one or more performance metrics for each of the plurality of instance families into a model, the model outputting a ranking metric for each instance family based on a corresponding values; and
　　generating a recommendation of an instance family for deployment based on a corresponding ranking metric.

2. The method of claim 1, wherein the one or more performance metrics comprise requests per second (RPS) and latency.

3. The method of claim 1, wherein the model assigns weights to the one or more performance metrics and integrates the values of the one or more performance metrics into a weighted score.

4. The method of claim 1, further comprising:
　determining a time required for the application to be deployed onto the test node; and
　waiting for the determined time before collecting the values of the one or more performance metrics.

5. The method of claim 1, wherein collecting the values of the one or more performance metrics on the test node comprises:
　generating a load against the test node, the load simulating user activities over a period; and
　collecting the values of the one or more performance metrics on the test node over the period of time.

6. The method of claim 1, the method further comprising:
　conducting an autocorrelation analysis to the collected values of the one or more performance metrics to determine a seasonality of workload; and
　setting the test time range based on the determined seasonality of the workload.

7. The method of claim 1, wherein collecting the values of the one or more performance metrics on the test node comprises collecting values of the one or more performance metrics from a client system.

8. The method of claim 1, wherein collecting the values of the one or more performance metrics on the test node comprises collecting values of the one or more performance metrics from a server system.

9. The method of claim 1, the method further comprising:
　for each instance family of the plurality of instance families,
　　visualizing the stored values of the one or more performance metrics;
　　sending the visualized values of the one or more performance metrics to a client system; and
　　causing the client system to present visualized values of the one or more performance metrics in a graphical user interface.

10. The method of claim 1, the method further comprising:
　generating a graphical user interface to present the ranking metrics of the plurality of the instance families.

11. A non-transitory computer readable storage medium having instructions encoded thereon that, when executed by one or more processors, cause the one or more processors to:
　access a configuration specifying a target application, one or more performance metrics, and a plurality of instance families that are candidates for deployment, where each of the plurality of instance families is a group of virtual machines having a different configuration of resources;

for each instance family of the plurality of instance families:
provision a test node by allocating resources based on configuration associated with a corresponding instance family;
temporarily deploy the target application on the provisioned test node during a test time range, and
collect and store values of the one or more performance metrics on a test node in a data store; and identify one of the plurality of instance families having a highest performance for the target application relative to other ones of the plurality of instance families, comprising:
inputting the values of the one or more performance metrics for each of the plurality of instance families into a model, the model outputting a ranking metric for each instance family based on a corresponding values; and
generating a recommendation of an instance family for deployment based on a corresponding ranking metric.

12. The non-transitory computer readable storage medium of claim 11, wherein the one or more performance metrics comprise requests per second (RPS) and latency.

13. The non-transitory computer readable storage medium of claim 11, wherein the model assigns weights to the one or more performance metrics and integrates the values of the one or more performance metrics into a weighted score.

14. The non-transitory computer readable storage medium of claim 11, wherein the instructions further cause the one or more processors to:
determine a time required for the application to be deployed onto the test node; and
wait for the determined time before collecting the values of the one or more performance metrics.

15. The non-transitory computer readable storage medium of claim 11, wherein collecting the values of the one or more performance metrics on the test node comprises:
generating a load against the test node, the load simulating user activities over a period; and
collecting the values of the one or more performance metrics on the test node over the period of time.

16. The non-transitory computer readable storage medium of claim 11, wherein the instructions further cause the one or more processors to:
conduct an autocorrelation analysis to the collected values of the one or more performance metrics to determine a seasonality of workload; and
set the test time range based on the determined seasonality of the workload.

17. The non-transitory computer readable storage medium of claim 11, wherein collecting the values of the one or more performance metrics on the test node comprises collecting values of the one or more performance metrics from a client systems.

18. The non-transitory computer readable storage medium of claim 11, wherein collecting the values of the one or more performance metrics on the test node comprises collecting values of the one or more performance metrics from a server system.

19. The non-transitory computer readable storage medium of claim 11, wherein the instructions further cause the one or more processors to:
for each instance family of the plurality of instance families,
visualize the stored values of the one or more performance metrics;
send the visualized values of the one or more performance metrics to a client system; and
causing the client system to present visualized values of the one or more performance metrics in a graphical user interface.

20. A computing system, comprising:
one or more processors; and
a non-transitory computer readable storage medium having instructions encoded thereon that, when executed by the one or more processors, cause the one or more processors to:
access a configuration specifying a target application, one or more performance metrics, and a plurality of instance families that are candidates for deployment, where each of the plurality of instance families is a group of virtual machines having a different configuration of resources;
for each instance family of the plurality of instance families:
provisioning a test node by allocating resources based on configuration associated with a corresponding instance family;
temporarily deploy the target application on the provisioned test node during a test time range, and
collect and store values of the one or more performance metrics on a test node in a data store; and
identify one of the plurality of instance families having a highest performance for the target application relative to other ones of the plurality of instance families, comprising:
inputting the values of the one or more performance metrics for each of the plurality of instance families into a model, the model outputting a ranking metric for each instance family based on a corresponding values; and
generating a recommendation of an instance family for deployment based on a corresponding ranking metric.

* * * * *

UNITED STATES PATENT AND TRADEMARK OFFICE
CERTIFICATE OF CORRECTION

PATENT NO. : 12,307,227 B1
APPLICATION NO. : 18/661997
DATED : May 20, 2025
INVENTOR(S) : Leonid Kuperman Page 1 of 1

It is certified that error appears in the above-identified patent and that said Letters Patent is hereby corrected as shown below:

In the Claims

In Column 20, in Claim 17, Line 3, delete "systems." and insert -- system. --, therefor.

Signed and Sealed this
Sixteenth Day of September, 2025

Coke Morgan Stewart
*Acting Director of the United States Patent and Trademark Office*